US006330485B1

(12) United States Patent
Hsu et al.

(10) Patent No.: US 6,330,485 B1
(45) Date of Patent: Dec. 11, 2001

(54) HIGH-SPEED MULTI-TASK SYSTEM

(75) Inventors: Wen-Tung Hsu, YunLin Hsien; Wen-Chang Kuo, Hsinchu; Kaou-Kuang Wang, Taipei; Jau-Lan Yeh, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/243,111

(22) Filed: Feb. 3, 1999

(51) Int. Cl.[7] .................................................... G06F 17/00

(52) U.S. Cl. ................................ 700/90; 700/1; 228/4.5; 438/106; 29/739

(58) Field of Search ................................ 700/212, 83, 1, 700/90; 118/712; 228/4.5; 438/106; 29/739

(56) References Cited

U.S. PATENT DOCUMENTS 4,941,255 * 7/1990 Bull ...................................... 29/833
5,684,374 * 11/1997 Chaffee ............................... 318/616
5,736,279 * 4/1998 Mott et al. ............................ 430/22
5,906,682 * 5/1999 Bouras et al. ....................... 118/712
6,112,054 * 8/2000 Kita .................................... 455/12.1

* cited by examiner

*Primary Examiner*—William Grant
*Assistant Examiner*—Ronald D Hartman, Jr.
(74) *Attorney, Agent, or Firm*—Dougherty & Troxell

(57) ABSTRACT

A high-speed multi-task system which configures with an industrial personal computer and a numerical controller. The industrial personal computer handles the human-machine interface, visual function and main process control, while the numerical controller controls the movements of hardware and input/output. Conventional serial communication port RS-232 is employed for data transmission between the two sub-systems. The high-speed multi-task system of the present invention is built to work in a real-time extension environment to optimize the control and efficiency of a wire bonding system.

9 Claims, 4 Drawing Sheets

HIGH-SPEED MULTI-TASK SYSTEM

BACKGROUND OF THE INVENTION

This invention relates to a high-speed multi-task system, particularly to a system which employs an industrial personal computer and a numerical controller for controlling a wire bonding system, with graphical window display and working in a real-time extension environment.

The overall performance of a system, particularly a wire bonding system, lies not only on its mechanical precision but also its electrical control system. A good electrical control system is indispensable to increasing working speed and precision, as well as to maintenance and operation. A wire bonding system is required to be characteristic of not only high speed, high precision, and high yield, but also easy to handle and maintain.

Accompanied with the increase in operating speed, the movement control of a wire bonding system has become more and more import. Conventional control of a wire bonding system is performed by a single chip. Single chip control inevitably makes software upgrade or replacement more difficult and time-consuming. This in turn leads to cost increase and imposes unfavorable limits to hardware maintenance.

U.S. Pat. No. 5,494,207 discloses a wire bonding system which electrically couples an integrated circuit to its associated wiring traces during semiconductor packaging. However, U.S. Pat. No. 5,494,207 did not show any human-machine interface which facilitates the operation of the wire bonding system, nor any numerical controller which controls the movements of the wire bonding system.

U.S. Pat. No. 5,199,629 discloses a wire bonding system which stores bonding data in a memory. The bonding data is transmitted to the wire bonding system through an input/out port as occasion demands. U.S. Pat. No. 5,199,629 failed to teach an integrated control system capable of real-time, multi-task operation.

SUMMARY OF THE INVENTION

According, it is an object of the present invention which provides a high-speed multi-task system with a human-machine interface to facilitate operation and maintenance.

It is another object of the present invention which provides a high-speed multi-task system with integrated control and capable of real-time, multi-task operation.

To achieve the foregoing and other objects, the present invention provides a high-speed multi-task system which comprises an industrial personal computer and a numerical controller. For the purpose of communication and control coordination, a serial communication port RS-232 is connected in between the industrial personal computer and the numerical controller. The industrial personal computer handles the human-machine interface, visual function and main process control, while the numerical controller controls the movements of hardware and input/output.

The industrial personal computer is working in a window-based environment, with graphical display. Although it is usual that a personal computer uses disk operating system (DOS) as its process control system, window-based system is selected under the consideration of its ever-growing popularity. PC window gains its popularity partly because of its user-friendliness, as well as easy to learn. Another consideration is that conventional DOS is limited to 640 K byte system memory. The restrain has made impossible the execution of systems or programs with a much bigger size. And yet the trend of software development is to have bigger and bigger systems to accommodate even more complicated jobs. Although DOS Extender has been developed to eliminate the 640 K byte restrain, human-machine interface is still a weak point to overcome.

BRIEF DESCRIPTION OF THE DRAWINGS

The invention, together with further objects and advantages thereof, may best be understood by reference to the following description taken in conjunction with the accompanying drawings in which.

DESCRIPTION OF THE PREFERRED EMBODIMENT

Figure 1:
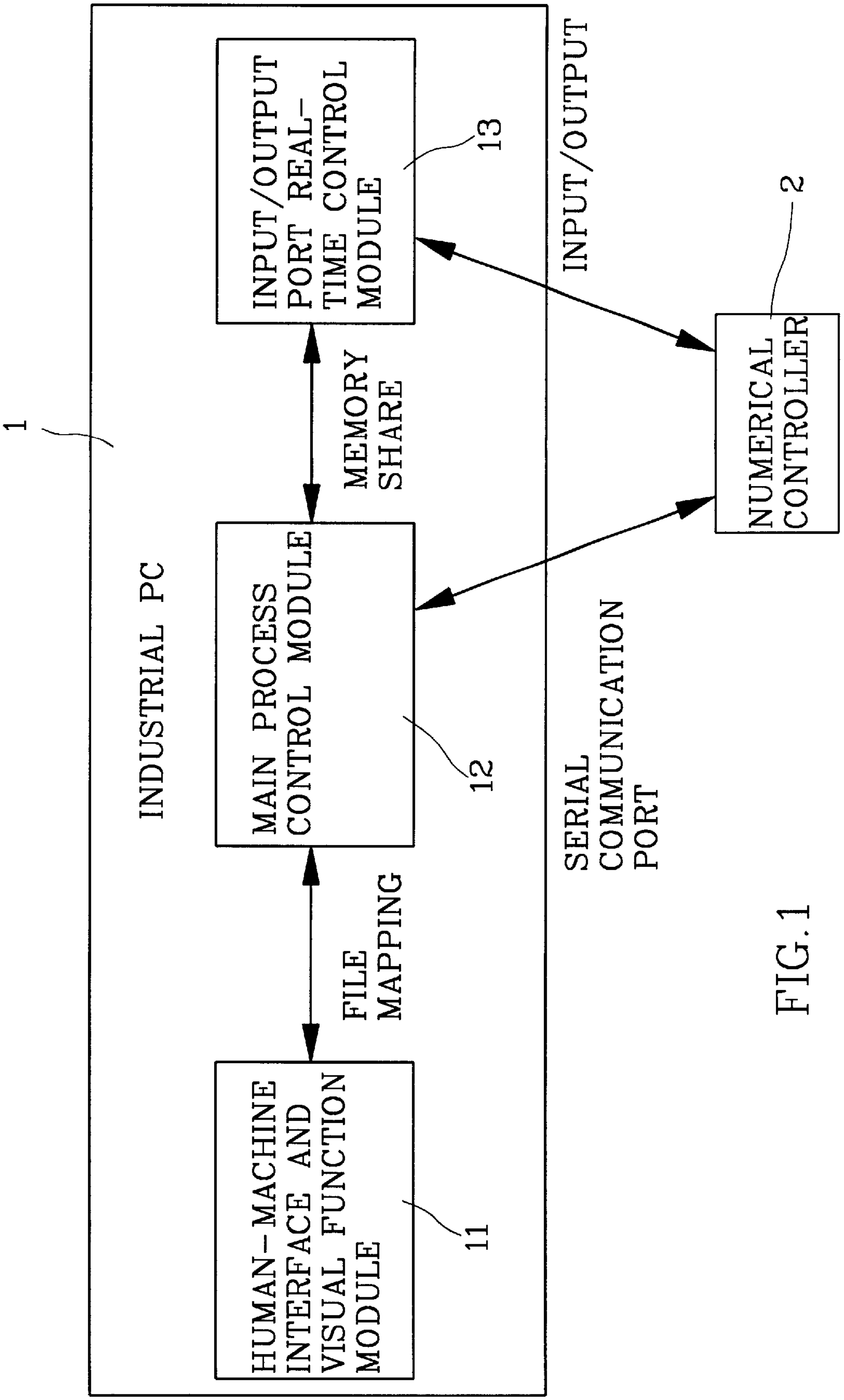
FIG. 1 is a block diagram of the structure of a preferred embodiment of a high-speed multi-task control system according to the present invention.

FIG. 1 is a block diagram showing the structure of a high-speed multi-task control system according to the present invention. The high-speed multi-task control system mainly comprises of two sub-systems; one is an industrial personal computer 1, the other a numerical controller 2. The industrial personal computer 1 is responsible for human-machine interface, visual function; real-time controlling input/output; and main process control module. The numerical controller 2 functions to control movement and input/output. In the case of using a communication line to transmit data and commands between the industrial personal computer 1 and the numerical controller 2, a serial communication port working with a real-time extension system, is employed.

For the purpose of providing human-machine interface and visual function, real-time controlling of input/output system, main process control of industrial personal computer 1 of FIG. 1, it is further divided into three sub-systems. The three sub-systems are a human-machine interface and visual function module 11, main process control module 12, and module of input/output port real-time control 13.

The human-machine interface and visual function module 11 handles the human-machine interface and image processing. The main functions of human-machine interface consist of file management, teaching mode of component and machine position, switching of automatic/manual mode, setting and modification of system parameter/machine position, setting and modification of product parameters which include bonding parameter and teach parameter, statistic data, performing calculation, hard disk and floppy disk control, self test of input/output and random memory access, in addition to fast keys, such as start key, pause key, and other keyboard shortcuts.

The functions of image processing include image display, which can be gray-level display, dichromatic display, continuous image capturing, and image frozen processing. The functions involve pattern matching, lead locator, and calibration. Image control module and human-machine interface belong to the same process module and are in the category of visual function of an industrial personal computer. The software which drives the human-machine interface and visual function module 11 is written in C++ programming language.

The main process control module 12 in FIG. 1 includes an error message handling module, wire bonding sequence control module, and communication control module. For the purpose of data transfer, main process control module 12 is connected to a numerical controller 2 through a serial communication port. The software which drives and controls the main process control module 12 is programmed in C++ programming language, and runs in the environment of a window-based real-time extension system.

The module of input/output port real-time control 13 is the main component, which handles the real-time control of the system. The software programming of this module is also in C++ programming language. The software is programmed to run in the real-time environment, which makes possible the real-time control of input/output data access, fast command input/out, and the communication and coordination with numerical controller 2.

Techniques of file mapping and share memory have been employed to transmit data and programs among main process control module 12, human-machine interface and visual function module 11, and input/output port real-time control module 13.

Figure 2:
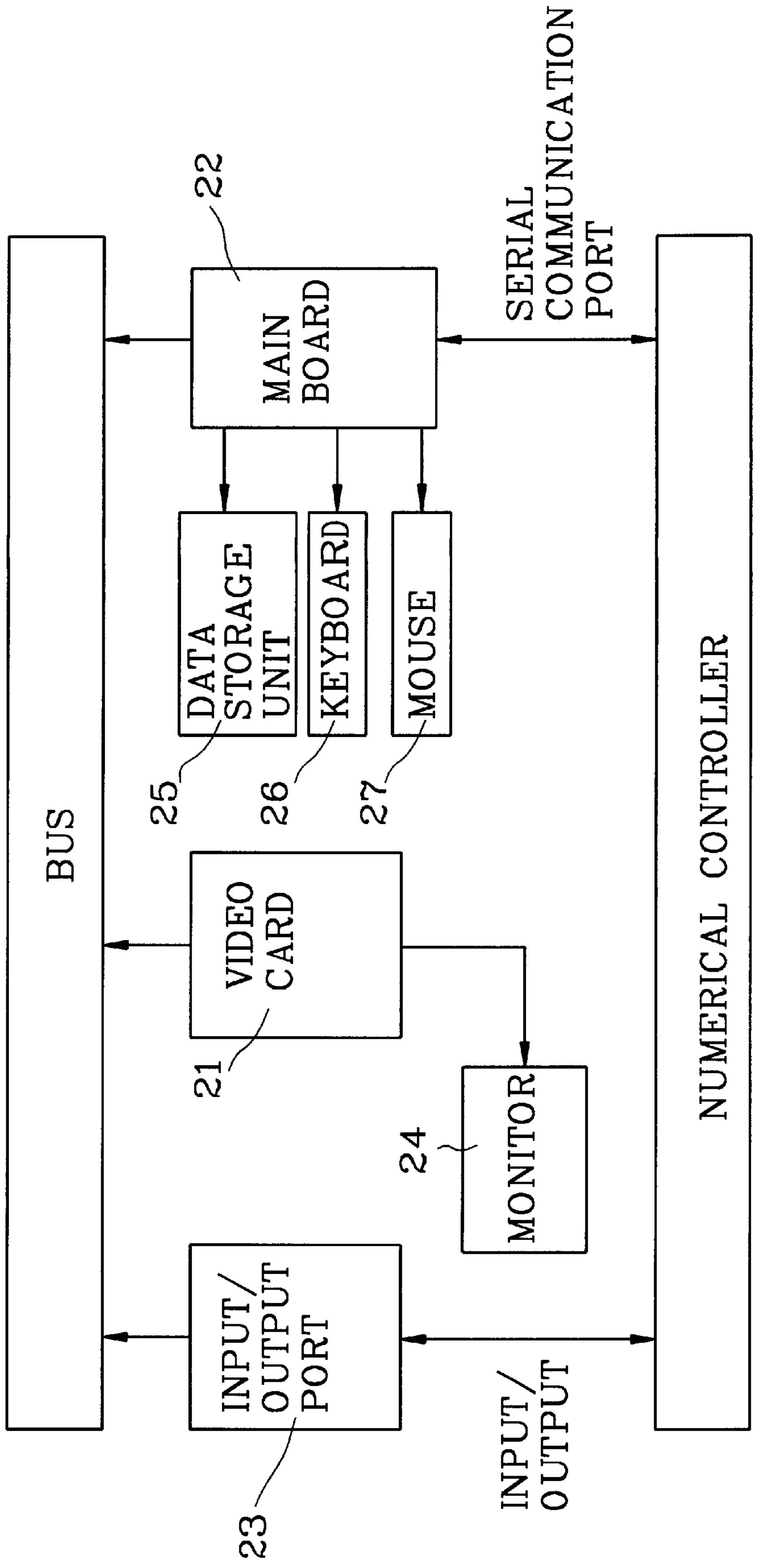
FIG. 2 is a block diagram showing the structure of the industrial personal computer control system 1 in FIG. 1.

Referring now to FIG. 2 where a block diagram shows the detailed configurations of the industrial personal computer 1 of FIG. 1. A video card 21 provides the functions of human-machine interface and visual function module 11 of FIG. 1. Video card 21 is coupled to a monitor 24 for displaying system status thereon. Through the monitor display, operator is informed of system status and responds accordingly. A mother board 22 performs the function of main process control module 12 of FIG. 1. The data and command given by the operator is fed to the system, for an integrated processing with internal command and data. Thereby efficient control is achieved. A conventional mother board 22 consists of a central processing unit (CPU), which is also referred to as micro-controller, with a minimum memory storage of 32 mega-byte, and multiple data bus for interface cards of various functions which help promote overall system efficiency. In addition, an input/output interface card connects a keyboard 26, and a mouse 27 to mother board 22 for user input. A data storage unit 25 which can be implemented with a hard disk/floppy disk is adopted for data storage. An input/output port 23 carries out the function of real-time control module 13 of FIG. 1. Input/output port 23 processes input/output and fast commands in a real-time environment.

A window-based operating system is adopted for the embodiment of the present invention. In order for graphical display and image processing, a conventional video card 21 equipped with a driving program can be employed. Input/output port 23, which is capable of real-time control, can be set as time-interrupt control or direct input/output access.

Figure 3:
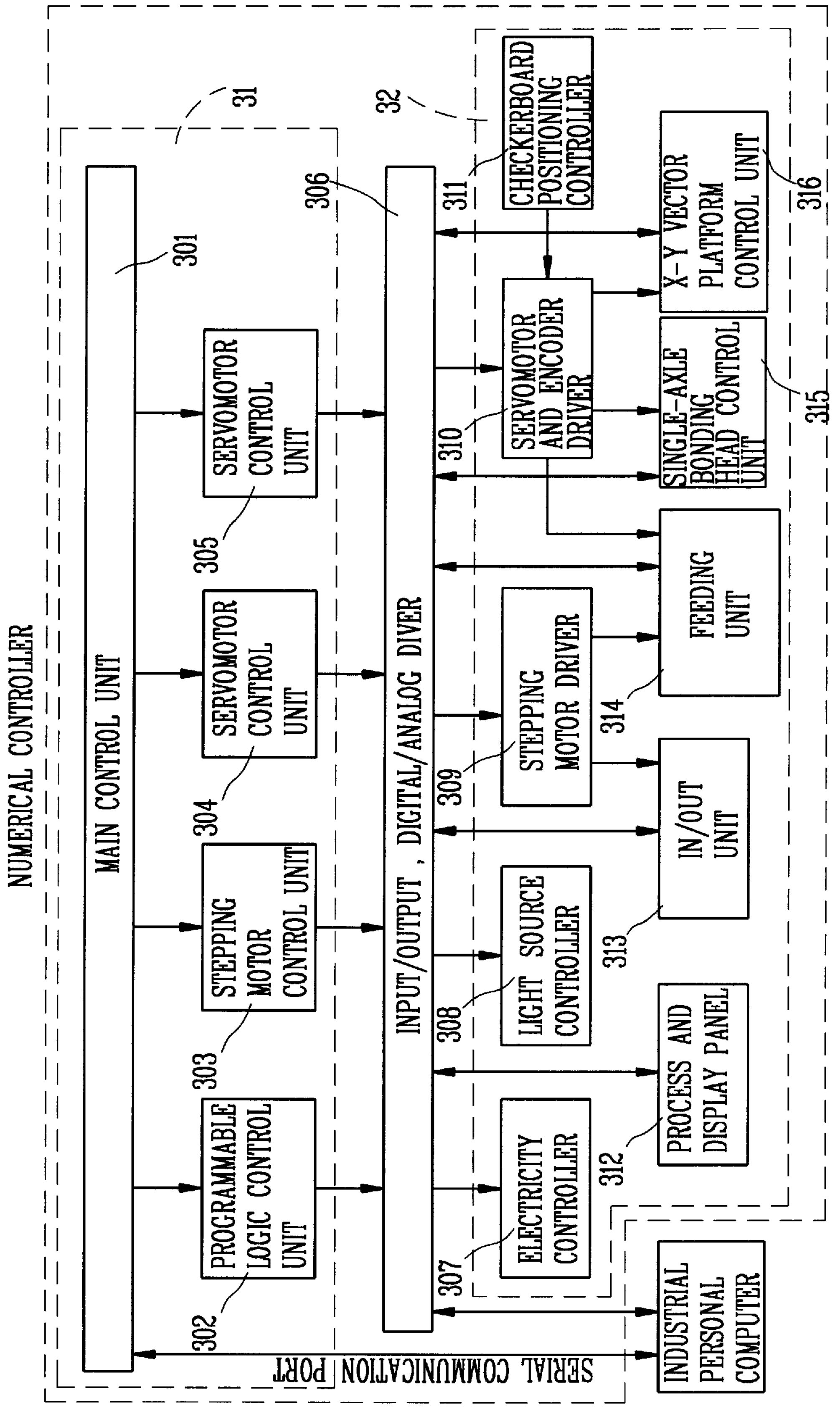
FIG. 3 is a block diagram showing the structure of the numerical control system 2 of FIG. 1.

FIG. 3 is a block diagram, which shows the detailed configuration of numerical controller, is according to the present invention. The numerical controller consists of a control unit 31 is made up of multiple micro-controllers. The mirco-controllers perform logical and algebraic operations in the unit of 1024-bit. The control unit 31 of the preferred embodiment comprises five micro-controllers. Among the five micro-controllers, a main control unit 301 is assigned the tasks of communication and the interpretation/compilation of component programs. Two servomotor control units 304 and 305 each control a 3-axle servomotor, with sampling time of 0.4 ms. A micro-controller which functions as a stepping motor controller 303 control a 9-axle stepping motor. The last micro-controller which is used as a programmable logic control unit 302, with scanning time of 1 ms, promotes the responding efficiency of sequence control.

Main control unit 301 is coordinate for the operations of programmable logic control unit 302, stepping motor controller unit 303, and servomotor control units 304 and 305. Main control unit 301 is coupled to industrial personal computer through a serial communication port for data transmission. One end of an input/output digital/analog driver 306 is connected to each of the controllers 302, 303, 304, and 305 for data communication. The other end of input/output digital/analog driver 306 is connected to a electricity controller 307, a light source controller 308, a stepping motor driver 309, a servomotor and encoder driver 310, a process and display panel 312, a 2-axle stepping in/out unit 313, a feeding unit 314 for single-axle servomotor and six-axle stepping motor, a single-axle bonding head control unit 315, and an X-Y vector platform control unit 316. Stepping motor driver 309 is also connected to 2-axle stepping in/out unit 313, and feeding unit 314 for single-axle servomotor and six-axle stepping motor. Servomotor and encoder driver 310 is also connected to feeding unit 314 for single-axle servomotor and six-axle stepping motor, single-axle bonding head control unit 315, and X-Y vector platform control unit 316. A checkerboard positioning controller 311 is drive by servomotor and encoder driver 310

Figure 4:
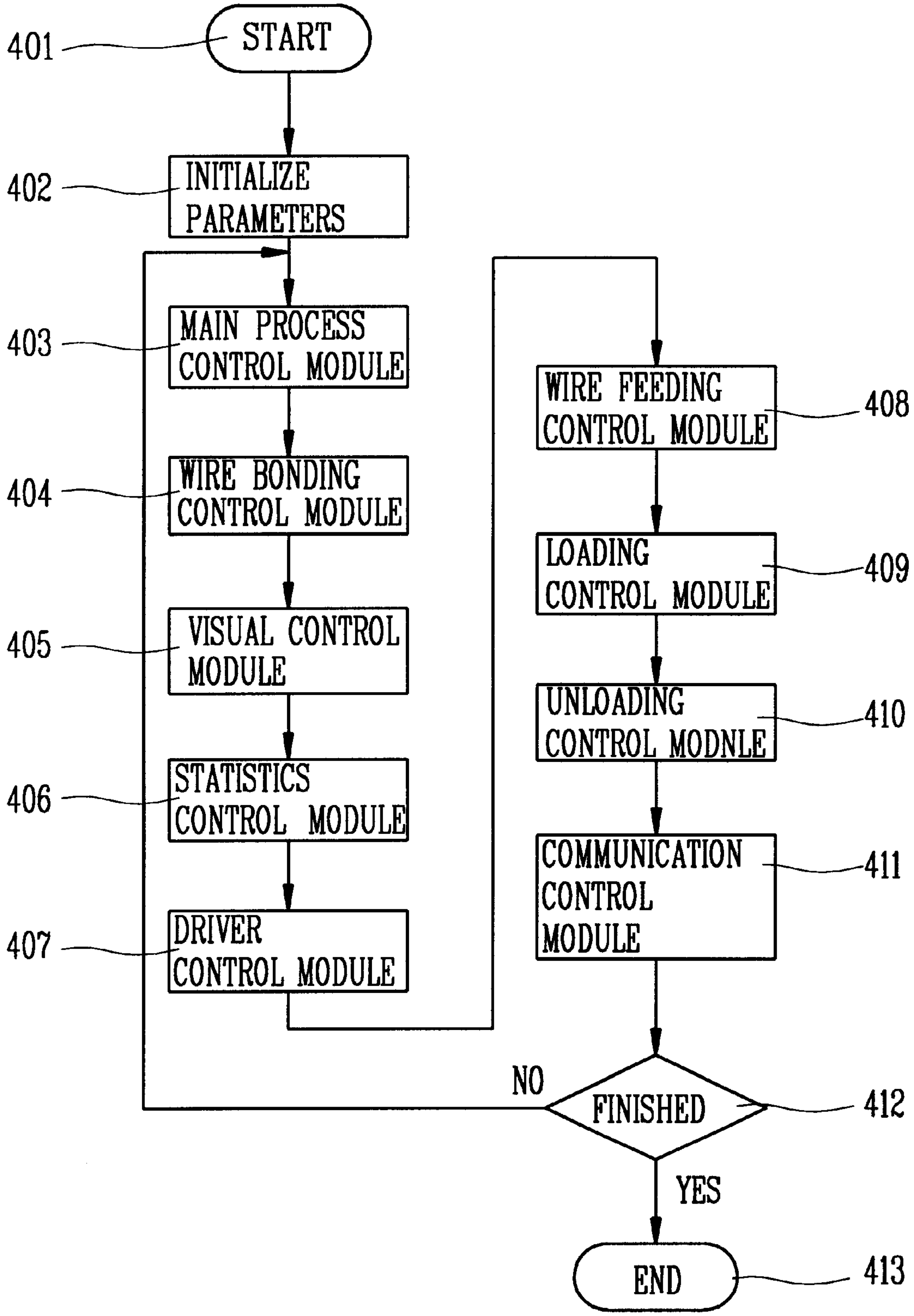
FIG. 4 is a flowchart showing the operation of the main process control module according to the present invention.

FIG. 4 is a flow chart showing the process flow of the present invention. In block 401, the system is set to start. Firstly, the system is tested and initialized to initial value in block 402. After initialization 402, main process control module is performed in block 403, followed by wire bonding control module 405, visual control module 405, and statistics control module 406. As soon as the statistics is completed, driver control module 407 is set to drive the components of the system. Wire feeding control module 408, loading control module 409, unloading control module 410, and communication control module 411 will be carried out in sequence. After performing communication control module 411, an inquiry for process repetition is presented in block 412. If a positive response is obtained, the process flow goes back to main process control module 403, and forms a loop. Otherwise, the process flow end at block 413.

The invention has been described in conjunction with an example. The present example is to be considered as illustrative and not restrictive, and the invention is not to be limited to the details given herein, but may be modified within the scope of the appended claims.

What is claimed is:

1. A high speed multi-task control system which comprises:

an industrial personal computer having:

a human-machine interface and a visual function module;

a main process control module; and a real-time system control module which processes real-time commands to control data access of an input/output port;

a numerical controller controlling movements and input/output, which further comprises:

a control unit consisting of multiple micro-processors;

an input/output digital/analog driver; and a serial communication port consisting of a general-purpose RS-232 communication system and a communication bus, said serial communication port connects said industrial personal computer and said numerical controller by transmitting messages and data therebetween, wherein said control unit comprises:

an electricity controller which controls the conduction of electricity;

a light source controller which controls the emission of a light source;

a stepping motor driver which drives a stepping motor;

a servomotor and an encoder driver which drives the servomotor and encodes;

a process status display panel which displays the current status of a process;

a 2-axle stepping in/out unit which drives a 2-axle stepping motor for material input and output;

a feeding unit for a single-axle servomotor and a six-axle stepping motor which derives said single-axle servomotor and said six-axle stepping motor for feeding in material;

a single-axle bonding head control unit which controls the positioning of a bonding head;

an X-Y vector platform control unit which controls an X-Y platform for horizontal movements; and a checkerboard positioning controller driven by said servomotor and encoder driver to enhance system driving and encoding efficiency.

2. A high speed multi-task control system as claimed in claim 1, wherein said human-machine interface and visual function module is composed of a video card connecting to a monitor, for displaying system status.

3. A high speed multi-task control system as claimed in claim 1, wherein said main process control module of said industrial personal computer is a mother board with a central processing unit (CPU), multiple mega-byte of random access memory, and multiple bus slots for connecting interface cards with said mother board.

4. A high speed multi-task control system as claimed in claim 3, wherein said main process control module makes use of said mother board connecting to said interface cards, said interface cards connecting keyboard and mouse for data input/output, and hard disk/floppy disk for data storage.

5. A high speed multi-task control system as claimed in claim 1, wherein said main process control module, said human-machine interface and a visual function module, and said input/output real-time system control module access a shared memory for reading and writing data.

6. A high speed multi-task control system as claimed in claim 1, wherein said main process control module, said human-machine interface and visual function module, and said input/output real-time system control module are controlled by software programs written in low-level programming language to enhance execution speed.

7. A high speed multi-task control system as claimed in claim 1, wherein said numerical controller comprises a control unit, said control unit consisting of multiple 1024-bit micro-controllers, one of said micro-controllers controlling communication and the interpretation/compilation of component programs, one of said micro-controllers functioning as a programmable logic control unit, one of said micro-controllers controlling the movements of a stepping motor, and two of said micro-controllers controlling the movements of a first and a second servomotors.

8. A high speed multi-task control system as claimed in claim 7, wherein said numerical controller further comprises an input/output digital/analog driver which integrates said micro-controllers for controlling said programmable logic control unit, said stepping motor, and said first and second servomotors, and coordinates with the components of said control unit.

9. A method of performing multiple tasks on a high-speed system, said method comprising the steps of:

starting to initialize said high-speed system to parameters which are required at the onset of operation of said high-speed system;

entering a main process control module, and performing calculation of working commands;

entering a wire bonding module, transmitting wire bonding commands and then starting a visual control;

entering a visual control module, and monitoring system performance to eliminate error occurrences;

entering a statistic control module, and carrying out statistics for data to determine system performance;

entering a driver control module, controlling drivers to execute driving commands;

entering a wire feeding control module, controlling movement of a wire feeding unit;

entering a loading module, and executing a wire bonding process;

entering an unloading module, enabling exiting of the wire bonding process;

entering a communication control module, transmitting working status of said high-speed system, and evaluating the repetition of a next task, and forming a loop of said process;

ending the process or returning to the main process control module for a next task.

* * * * *